United States Patent
Bibeau

(10) Patent No.: US 11,078,610 B2
(45) Date of Patent: Aug. 3, 2021

(54) INSULATING GARMENT FOR FIREFIGHTER BUNKER GEAR

(71) Applicant: Logistik Unicorp Inc., Saint-Jean-sur-Richelieu (CA)

(72) Inventor: Louis Bibeau, Magog (CA)

(73) Assignee: Logistik Unicorp Inc, St-Jean-sur-Richelieu (CA)

( * ) Notice: Subject to any disclaimer, the term of this patent is extended or adjusted under 35 U.S.C. 154(b) by 1275 days.

(21) Appl. No.: 15/006,448

(22) Filed: Jan. 26, 2016

(65) Prior Publication Data

US 2016/0213078 A1 Jul. 28, 2016

Related U.S. Application Data

(60) Provisional application No. 62/107,773, filed on Jan. 26, 2015.

(51) Int. Cl.
*A41D 1/00* (2018.01)
*D04B 1/24* (2006.01)
(Continued)

(52) U.S. Cl.
CPC ............. *D04B 1/24* (2013.01); *A41D 31/085* (2019.02); *B32B 5/024* (2013.01); *B32B 5/026* (2013.01);
(Continued)

(58) Field of Classification Search
CPC ...................................................... A41D 1/00
See application file for complete search history.

(56) References Cited

U.S. PATENT DOCUMENTS 5,095,549 A * 3/1992 Aldridge .............. A62B 17/003
2/102
6,974,785 B1 * 12/2005 Barbeau ............. A41D 31/0022
169/45
(Continued)

FOREIGN PATENT DOCUMENTS

WO WO-2012153131 A1 * 11/2012 ............. D04B 21/12

OTHER PUBLICATIONS

Double Weave definition, Complete Textile Glossary, Celanese Acetate. (Year: 2001).*
(Continued)

*Primary Examiner* — Andrew T Piziali
(74) *Attorney, Agent, or Firm* — Forge IP, PLLC

(57) ABSTRACT

An insulating garment for use as thermal and moist repellent barrier in a firefighter bunker gear is disclosed, the garment being adapted to be worn by a firefighter under a bunker gear. The garment being made from a fire-resistant insulating fabric comprising: a first woven or knitted fire-resistant fabric layer; a second woven or knitted fire-resistant fabric layer; and at least one monofilament yarn interconnecting the first and second layers, thereby creating an insulating space between the layers. Each monofilament yarn is made of a material having a compressive strength from about 0.5 to about 2.5 cN·cm/cm² and a resilience superiors or equals to about 25% to maintain the insulating space between the layers and therefore thermal and moist insulation. Preferably, the material further has a high melting point and/or high transition temperatures. The material of the monofilament yarn may comprise polyphenylene sulphide (PPS), polyetheretherketone (PEEK) or Polyetherimide (ULTEM™).

18 Claims, 10 Drawing Sheets

(51) Int. Cl.
  *B32B 5/02*    (2006.01)
  *B32B 5/26*    (2006.01)
  *B32B 27/32*   (2006.01)
  *B32B 27/40*   (2006.01)
  *B32B 27/12*   (2006.01)
  *B32B 5/30*    (2006.01)
  *B32B 5/12*    (2006.01)
  *D04B 21/20*   (2006.01)
  *B32B 5/22*    (2006.01)
  *B32B 5/06*    (2006.01)
  *A41D 31/08*   (2019.01)

(52) U.S. Cl.
  CPC .......... *B32B 5/06* (2013.01); *B32B 5/12* (2013.01); *B32B 5/22* (2013.01); *B32B 5/26* (2013.01); *B32B 5/30* (2013.01); *B32B 27/12* (2013.01); *B32B 27/322* (2013.01); *B32B 27/40* (2013.01); *D04B 21/207* (2013.01); *A41D 2500/10* (2013.01); *A41D 2500/20* (2013.01); *B32B 2262/02* (2013.01); *B32B 2262/0269* (2013.01); *B32B 2264/0257* (2013.01); *B32B 2307/304* (2013.01); *B32B 2307/306* (2013.01); *B32B 2307/3065* (2013.01); *B32B 2307/50* (2013.01); *B32B 2307/72* (2013.01); *B32B 2307/724* (2013.01); *B32B 2307/7265* (2013.01); *B32B 2307/73* (2013.01); *B32B 2437/00* (2013.01); *B32B 2571/00* (2013.01); *D10B 2403/0112* (2013.01); *D10B 2403/021* (2013.01); *D10B 2501/04* (2013.01)

(56) References Cited

U.S. PATENT DOCUMENTS

| | | | |
|---|---|---|---|
| 7,681,417 B2* | 3/2010 | Hagihara | A41D 19/01529 |
| | | | 2/161.6 |
| 2007/0284558 A1* | 12/2007 | Flay | A41D 31/0027 |
| | | | 252/608 |
| 2010/0251653 A1* | 10/2010 | Mills | B64G 1/50 |
| | | | 52/506.05 |
| 2012/0177904 A1* | 7/2012 | Gehring, Jr. | D04B 21/10 |
| | | | 428/220 |
| 2013/0174334 A1* | 7/2013 | Kuroda | A41D 31/0027 |
| | | | 2/455 |
| 2014/0080373 A1* | 3/2014 | Keitch | D04B 21/20 |
| | | | 442/1 |

OTHER PUBLICATIONS

Definition of Yarn, Complete Textile Glossary, Celanese Acetate. (Year: 2001).*

* cited by examiner

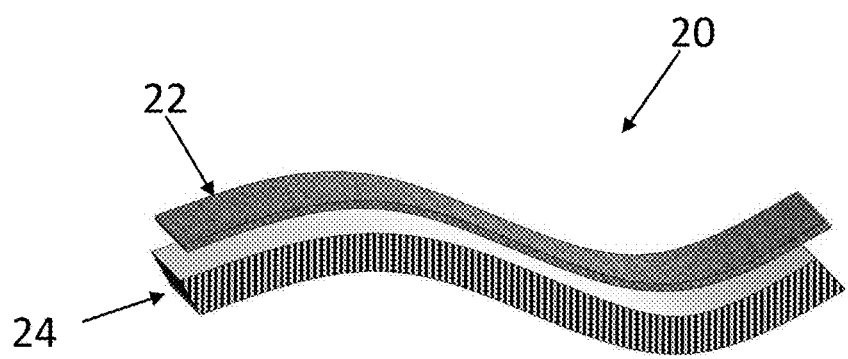
FIGURE 3
FIGURE 4
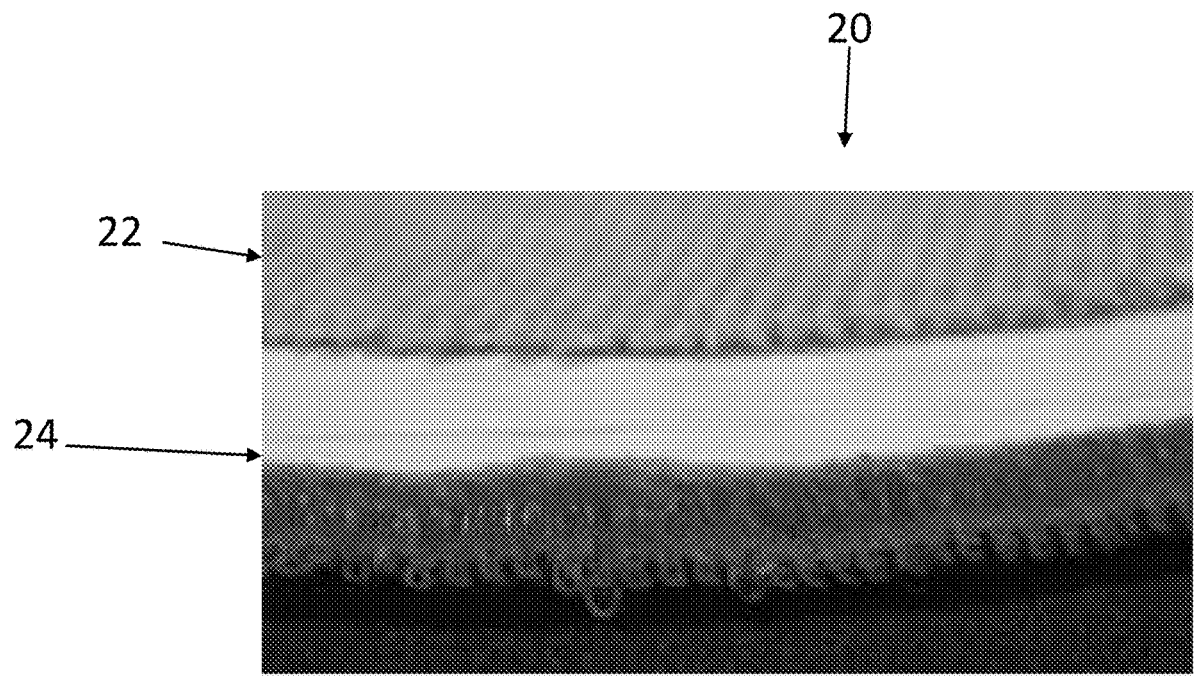

INSULATING GARMENT FOR FIREFIGHTER BUNKER GEAR

CROSS-REFERENCE TO RELATED APPLICATIONS

The present patent application claims the benefits of priority of U.S. Patent Application No. 62/107,773, entitled "Laminated spacer fabric for firefighter bunker gear", and filed at the U.S. Patent Office on Jan. 26, 2015, the content of which is incorporated herein by reference.

FIELD OF THE INVENTION

The present invention belongs to the field of textile or fabric technology. More particularly, the invention relates to fire resistant fabric assembly such as, but not limited to, laminated spacer fabric for use as thermal and moist repellent garment in a firefighter bunker gear.

BACKGROUND OF THE INVENTION

"Bunker gear" or "turnout gear" are terms used by many firefighters to refer to their Personal Protective Equipment or PPE. "Bunker gear" and "turnout gear" can refer, depending on the context, to just the trousers, boots and jacket, or to the entire combination of personal protective equipment and personal protective clothing. The terms are derived from the fact that the trousers and boots are traditionally kept by the firefighter's bunk at the fire station to be readily available for use.

Given the extreme conditions under which firefighters operate on a fire scene, which comprise exposure to extreme heat, combined with water and mechanical stress, the need for the development of new firefighter outfits or bunker gears, has since long been identified and solutions have been developed over the years.

Generally, a firefighter bunker gear is composed of a multilayer structure made of three distinct layers: the outer layer (or outershell), the water repellent or moisture barrier (such as waterproof-breathable membrane) and the thermal barrier (for insulation). The outer fabric protects from flame, direct heat and mechanical wear stress, the moisture barrier, consisting of a moisture membrane, confers waterproof protection together with good breathability, while the thermal barrier main function is to prevent the transfer of heat.

Traditional textiles used as thermal insulating barrier are heat insulating materials which function as a heat trap in the textile air-filled spaces. The function of the thermal barrier is to retain heat as long and as efficiently as possible. In the past, the thermal barrier comprised a non-woven or felt made of wool fibers (the structure of a wool fiber stores a significant amount of air), which has a good thermal insulation capacity. Today, this barrier is made of advanced technical fibers such as Aramid resin (e.g. KEVLAR® by DuPont) of the meta-aramid type (e.g. NOMEX® by DuPont). See for instance U.S. Pat. No. 6,974,785 B1 (Barbeau et al.).

Known in the art are fire insulating barriers comprising two adjacent fire-resistant fabrics attached together with pile yarns, creating as such between the layers an insulating space. We may refer to US patent application no. 2007/0284558 A1 (Flay et al.), the content of which is incorporated herein by reference. However, Flay refers indistinctly to the use of pile yarns for attaching the two layers: in addition to using the term "pile yarn", which is appropriate only when the connecting yarn of double density velvet fabric has been severed, Flay fails to identify the overall essential function of the connecting yarn, in terms of material, flammability, and architecture, in order to ensure, the required resistance to high compression, for instance in bunker gear areas such as knees and elbows, or shoulders. Indeed, shoulders are critical areas for firefighters carrying heavy loads, hence causing high compression in these areas, where burns could result by loss of thermal insulation due to compression fire resistant barrier loses its protection property.

Hence, despite ongoing developments in the field of laminated spacer fabric for firefighter bunker gear, there is still a need for improved firefighter bunker gears which mitigates at least some of the shortcomings of the prior art.

SUMMARY OF THE INVENTION

The present invention generally relates to an insulating garment for use as thermal and moist repellent barrier in a firefighter bunker gear.

According to one aspect of the invention, it is disclosed an insulating garment for use as thermal and moist repellent barrier in a firefighter bunker gear, the garment being adapted to be worn by a firefighter under a bunker gear. The garment is made from a fire-resistant insulating fabric comprising:

a first woven or knitted fire-resistant fabric layer;

a second woven or knitted fire-resistant fabric layer; and at least one monofilament yarn interconnecting the first and second layers, thereby creating an insulating space between the layers. Each monofilament yarn is made of a material having a compressive strength from about 0.5 to about 2.5 cN·cm/cm$^2$ and a resilience superior or equal to about 25% to maintain the insulating space between the layers and therefore thermal and moist insulation.

According to another aspect of the invention, it is disclosed a method for the making of an insulating garment for use as thermal and moist repellent barrier in a firefighter bunker gear. The method comprises the steps of:

a) providing a first woven or knitted fire-resistant fabric layer;

b) providing a second woven or knitted fire-resistant fabric layer;

c) interconnecting the first and second layers with at least one monofilament yarn, thereby making a fire-resistant insulating fabric with an insulating space between the layers; and d) assembling the fire-resistant insulating fabric formed in step c) to form the insulating garment;

wherein each monofilament yarn used in step c) is made of a material having a compressive strength from about 0.5 to about 2.5 cN·cm/cm$^2$ and a resilience superior or equal to about 25% in order to maintain the insulating space between the layers when the insulating garment is used under the bunker gear.

According to one aspect of the invention, it is disclosed the use of a fire-resistant insulating fabric as disclosed herein for the making of an insulating garment used as thermal and moist repellent barrier in a firefighter bunker gear.

Advantageously, the insulating garment according to the present invention allows the elimination of a layer to the firefighter bunker gear found in prior art and thus a garment with two layers is obtained instead of three. This development has resulted in a fabric to improve comfort and flexibility of firefighter clothing and reduce the thermal stress to which firefighters are exposed. In this context, the evolving fabric is made from a double velvet piece manufacturing technique, which will result in a woven or knitted fabric, called "double density" or spacer fabric.

Double density barriers are generally weft knitted but may also be manufactured in warp knitting or weaving. This is a fabric composed of two parallel parts, linked by connecting yarns. The fabric is made up of two knitted fabrics physically connected by a continuous yarn. The method is similar to the manufacture of double piece velvet weaving with the exception that the two fabric layers are not separated after manufacture but rather used as is. This assembly of two separate fabrics but interconnected, allows to obtain excellent thermal insulation due to the space filled with air between the two layers of tissue. Indeed, the open space between the two fabrics allows among others to "trap" a large quantity of air, to obtain a good heat resistance. The use of a monofilament to bond the two fabric allows, among other, allows to have a product with a high compressive strength to keep at all times the thermal insulation properties.

The fabric can be then laminated with a waterproof-breathable membrane to high performance.

The open space between the two fire-resistant fabrics of double density can "capture" a large quantity of air, to obtain a good heat resistance. The use of a monofilament to bond the two fabrics, allows having a product with a high compressive strength to retain the thermal insulation properties mentioned above. Coupled with the outer layer (Outershell), this fabric allows improved comfort and protection for firefighters, replacing the current thermal and moisture barrier.

Other and further aspects and advantages of the present invention will be better understood upon the illustrative embodiments about to be described, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 3 is a schematic side view of a fire insulating barrier assembly for firefighter bunker gear according to a preferred embodiment of the present invention;

FIG. 4 is a side picture view of the barrier assembly illustrated on FIG. 3;

DETAILED DESCRIPTION OF PREFERRED EMBODIMENTS

Figure 1:
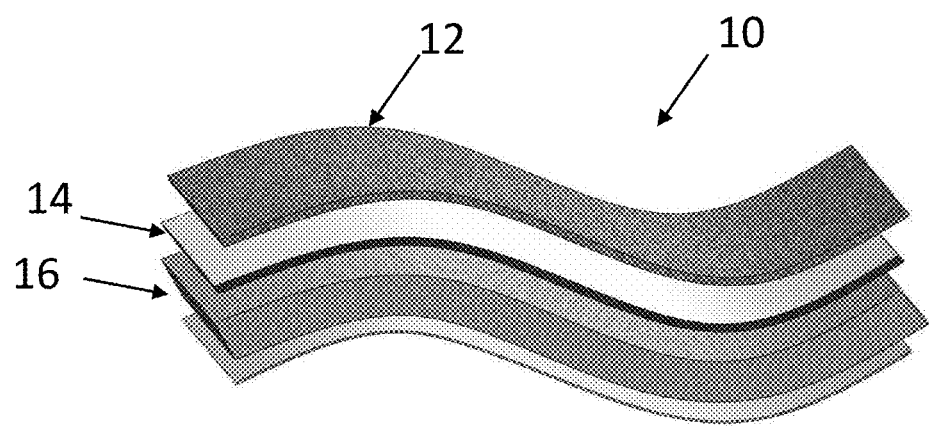
FIG. 1 is a schematic side view of a three-layer insulating barrier according to prior art.

A novel insulating garment for use as thermal and moist repellent barrier in a firefighter bunker gear will be described hereinafter. Although the invention is described in terms of specific illustrative embodiment(s), it is to be understood that the embodiment(s) described herein are by way of example only and that the scope of the invention is not intended to be limited thereby.

As aforesaid, the present invention is first directed to an insulating garment for use as thermal and moist repellent barrier in a firefighter bunker gear, the garment being adapted to be worn by a firefighter under a bunker gear. The garment is made from a fire-resistant insulating fabric comprising:

a first woven or knitted fire-resistant fabric layer;
a second woven or knitted fire-resistant fabric layer; and
at least one monofilament yarn interconnecting the first and second layers, thereby creating an insulating space between the layers. Each monofilament yarn is made of a material having a compressive strength from about 0.5 to about 2.5 cN·cm/cm$^2$ and a resilience superiors or equals to about 25% to maintain the insulating space between the layers and therefore thermal and moist insulation.

According to a preferred embodiment of the invention, the insulating garment may further comprise a waterproof-breathable membrane laminated on one of the layers, the membrane being breathable and adapted to repel water and/or moisture.

According to one aspect of the invention, the fire insulating barrier assembly as disclosed herein may further comprise at least one further protective layer operatively connected to an outside surface of one the fire-resistant fabric layers. The at least one further protective layer may be selected from outershell and moisture barrier, such as those known in the art of making of firefighter bunker gear.

According to a preferred embodiment of the invention, the garment may comprise a top section forming a vest and a bottom portion forming pants, the vest and the pants having a size adapted to be worn by the firefighter. The vest and the pants may further comprise an attaching system adapted to removably attach the vest and the pants to an inside surface of the bunker gear. The attaching system can any attaching system known in the art such as but not limited to zips, buttons, Velcro™ or the like.

According to another aspect of the invention, the two fabric layers of the fire insulating fabric are knitted to form a double-density knitwear where the monofilament yarn forms an angle of about 90° and each inside surfaces of the layers of the fabric.

According to another aspect of the invention, the fire insulating barrier assembly disclosed herein may comprise two monofilament yarns intermingling within the insulating space to improve compressive strength.

According to another aspect of the invention, the material forming monofilament yarn has a linear density of at least 100 d (denier) and is a non-melting material. More preferably, the linear density of the yarn is from 100 d to 200 d and has a melting point superior or equals to 200° C.

According to another aspect of the invention, the material of the monofilament yarn comprises polyphenylene sulphide (PPS), polyetheretherketone (PEEK) or Polyetherimide (ULTEM™). Other known polymeric material having very high melting point (preferably but not limited to temperature equal or superior to 260° C.) and glass transition temperatures, and resistant to compression can be used for the making of the barrier assembly.

According to another aspect of the invention, the first and second layers of the fabric have a linear density of between 100 and 265 dTex. The fire-resistant fabric layers can be made of spun yarn and/or multi-filament yarn comprising fire-resistant material such as, but not limited to, aramid polymers (meta or para), polyazole compounds, polyimide compounds, polyimidazole compounds, or the like. More preferably, spun yarn and/or multi-filament yarn may comprise polyparaphenylene terephtalamide (PPD-T, known as KEVLAR®); polyparaphenylene terephtalamide copolymer (known as Technora T240™); polymetaphenylene isophtalamide (MPD-I, known as NOMEX™); poly(p-phenylene-2,6-benzobisoxazole (PBO—known as Zylon™); polyamide imide (known as Kermel™); polyimide (such as P84 by Evonik); or polybenzimidazole (PBI short for poly[2,2'-(m-phenylen)-5,5'-bisbenzimidazole]).

According to another aspect of the invention, it is disclosed a method for the making of an insulating garment for use as thermal and moist repellent barrier in a firefighter bunker gear. The method comprises the steps of:

a) providing a first woven or knitted fire-resistant fabric layer;

b) providing a second woven or knitted fire-resistant fabric layer;

c) interconnecting the first and second layers with at least one monofilament yarn, thereby making a fire-resistant insulating fabric with an insulating space between the layers; and d) assembling the fire-resistant insulating fabric formed in step c) to form the insulating garment;

wherein each monofilament yarn used in step c) is made of a material having a compressive strength from about 0.5 to about 2.5 cN·cm/cm$^2$ and a resilience superiors or equals to about 25% in order to maintain the insulating space between the layers when the insulating garment is used under the bunker gear.

According to another aspect of the invention, the method may further comprise before step d) the step of laminating a waterproof-breathable membrane on one of the layers, the membrane being breathable and adapted to repel water and/or moisture.

According to another aspect of the invention, step d) of the method may comprise the steps of making a top section forming a vest and a bottom portion forming pants, the vest and the pants having a size adapted to be worn by the firefighter.

According to another aspect of the invention, step d) of the method may further comprise the steps of fixing to the vest and pants an attaching system adapted to removably attach the vest and the pants to an inside surface of the bunker gear. The attaching system can any attaching system known in the art such as but not limited to zips, buttons, Velcro™ or the like.

According to another aspect of the invention, in step c) of the method, each monofilament yarn of the fabric once interconnecting the layers forms an angle of about 90° with each inside surface of the layers.

According to another aspect of the invention, step c) may comprise the step of intermingling two monofilament yarns within the insulating space to improve compressive strength.

Figure 2:
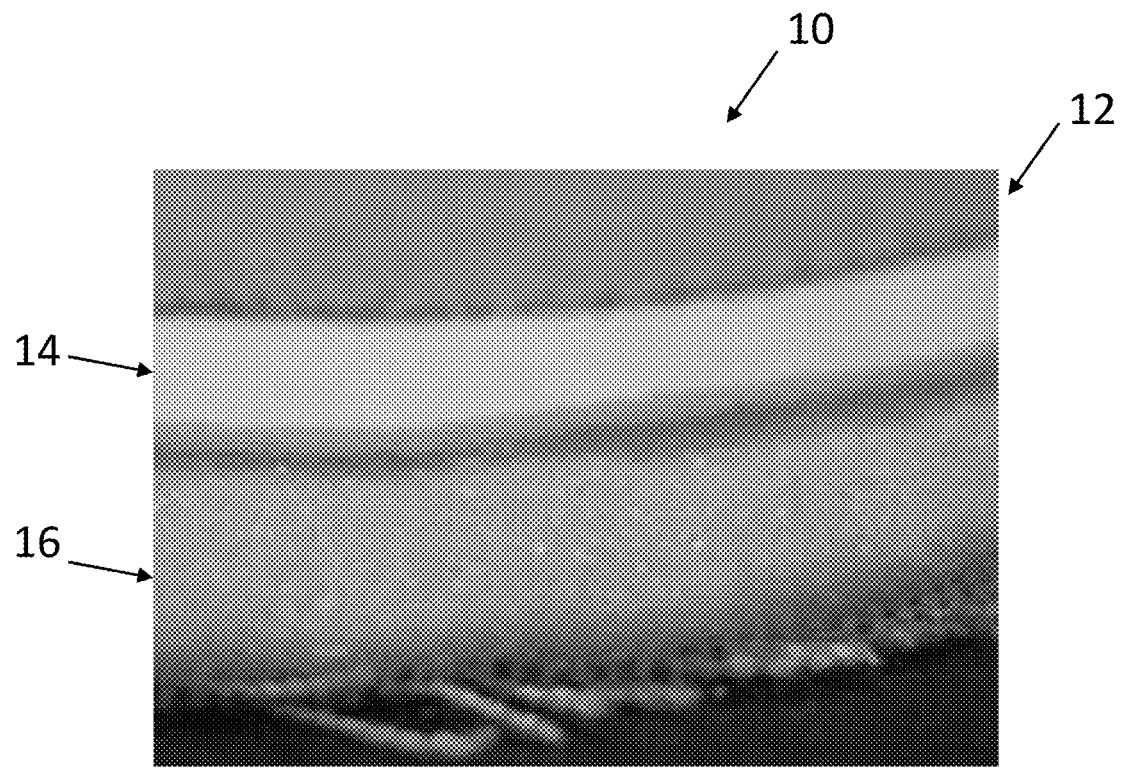
FIG. 2 is a side picture view of a three-layer insulating barrier according to prior art.

FIGS. 1 and 2 illustrate a barrier assembly (10) known in the art having an outershell (12), a moisture barrier (14) and a thermal barrier (16) or facecloth, usually bound together.

FIGS. 3 and 4 illustrate a double-spacer barrier or fabric (20) according to one embodiment of the invention, comprising an outershell (22) and a laminated spacer fabric (24) having thermal and moisture barrier properties.

Figure 5:
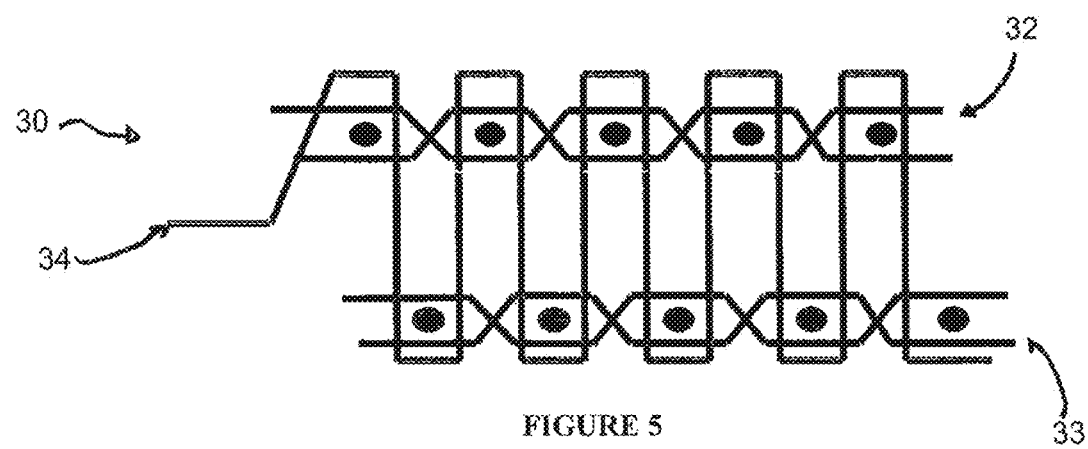
FIG. 5 is a schematic side view of double piece velvet with one connecting yarn according to a preferred embodiment of the present invention.

FIG. 5 illustrates a double piece velvet (30) comprising an upper and lower fire resistant fabric layers (32, 33) and a monofilament connecting yarn (34).

Figure 6:
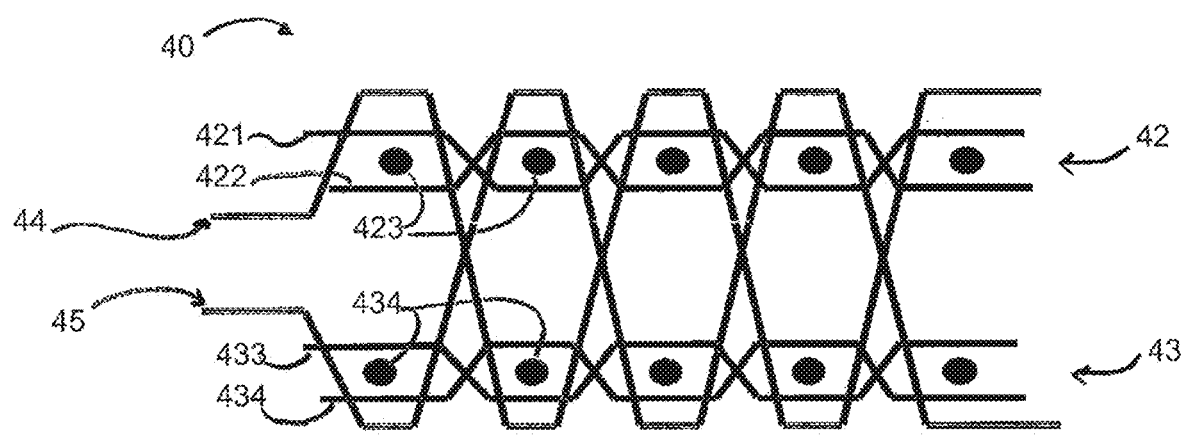
FIG. 6 is a schematic side view of double piece velvet with two connecting yarns according to a preferred embodiment of the present invention.

FIG. 6 illustrates a double piece velvet (40) comprising an upper and lower fire resistant fabric layers (42,43) and two monofilament connecting yarns (44,45) intermingling in the inter-space or gap (46) defined by the two layers.

Figure 7:
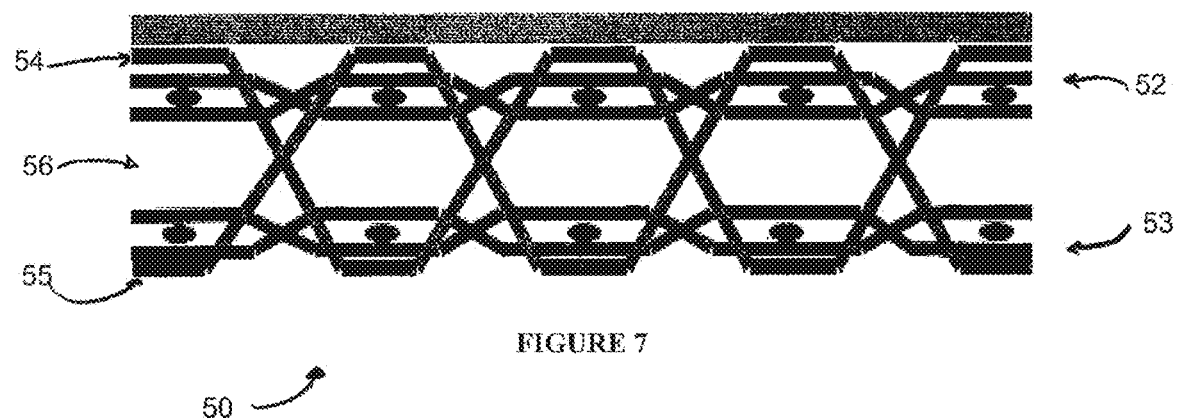
FIG. 7 is a schematic side view of an insulated barrier, made of laminated woven spacer fabric according to a preferred embodiment of the present invention, where double piece velvet acts both as water-repellent barrier and thermal barrier.

FIG. 7 illustrates an insulated barrier made of laminated woven spacer fabric (50) comprising an upper and lower fire resistant fabric layers (52,53), two monofilament connecting yarns (54,55) intermingling in the inter-space or gap (56) defined by the two layers, and a water repellent (or moisture barrier) and breathable membrane (58).

Figure 11:
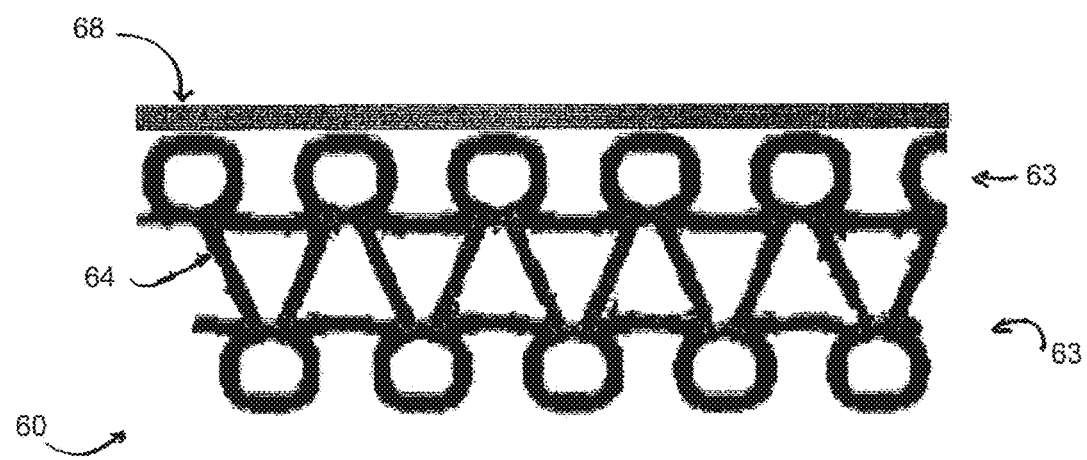
FIG. 11 is a schematic side view of an insulated barrier, made of laminated knitted spacer fabric according to a preferred embodiment of the present invention.

FIG. 11 shows an insulated barrier (60) made of laminated knitted spacer fabric comprising an upper and lower fire resistant fabric layers (62,63), one monofilament connecting yarn (64) and a water repellent (or moisture barrier) and breathable membrane (68).

Figure 12:
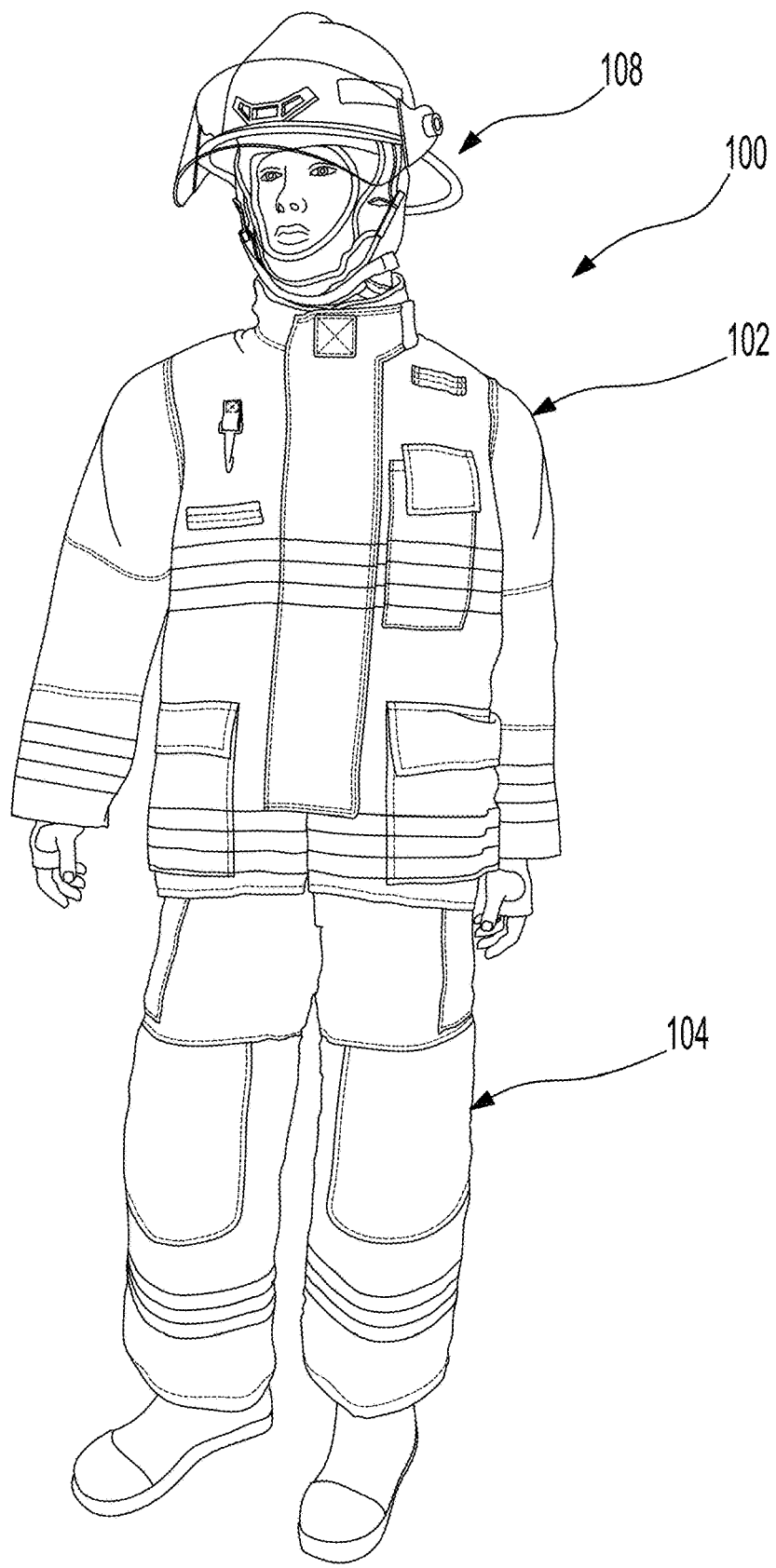
FIG. 12 is an illustration of a firefighter bunker gear.
Figure 13:
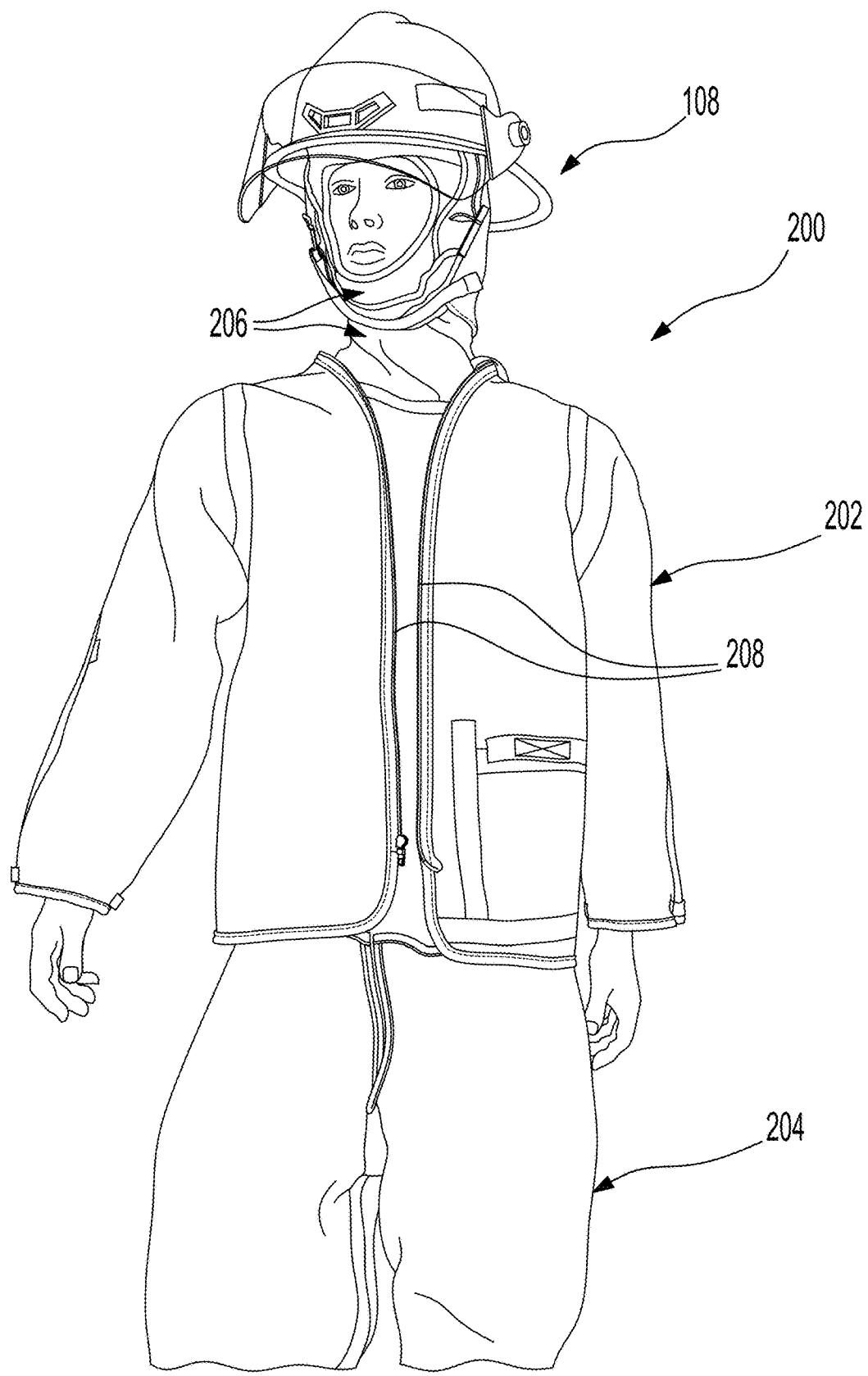
FIG. 13 is an illustration of an insulating garment according to a preferred embodiment of the present invention.
Figure 14:
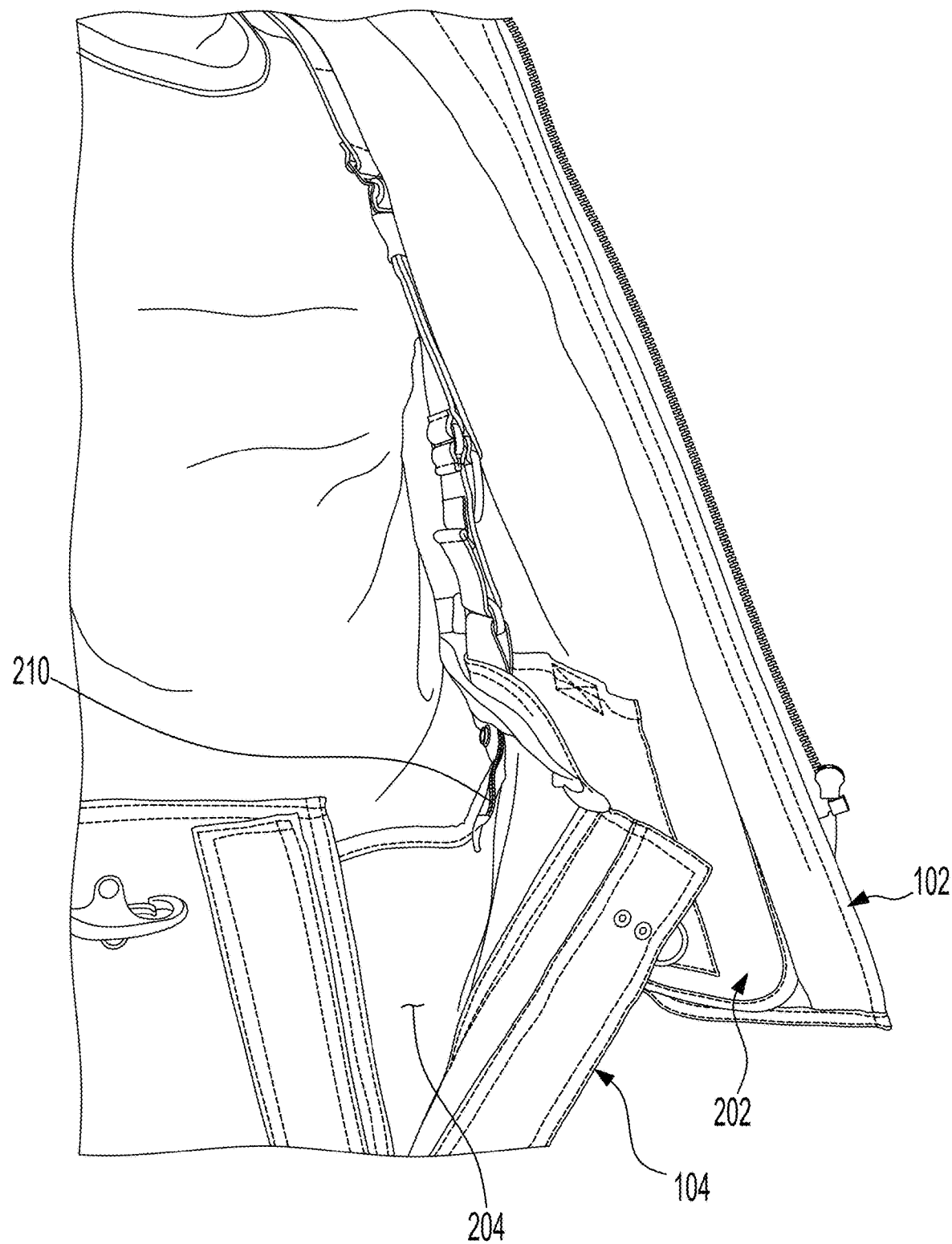
FIG. 14 is an illustration of the different sections of an insulating garment according to a preferred embodiment of the present invention worn under a firefighter bunker gear.
Figure 15:
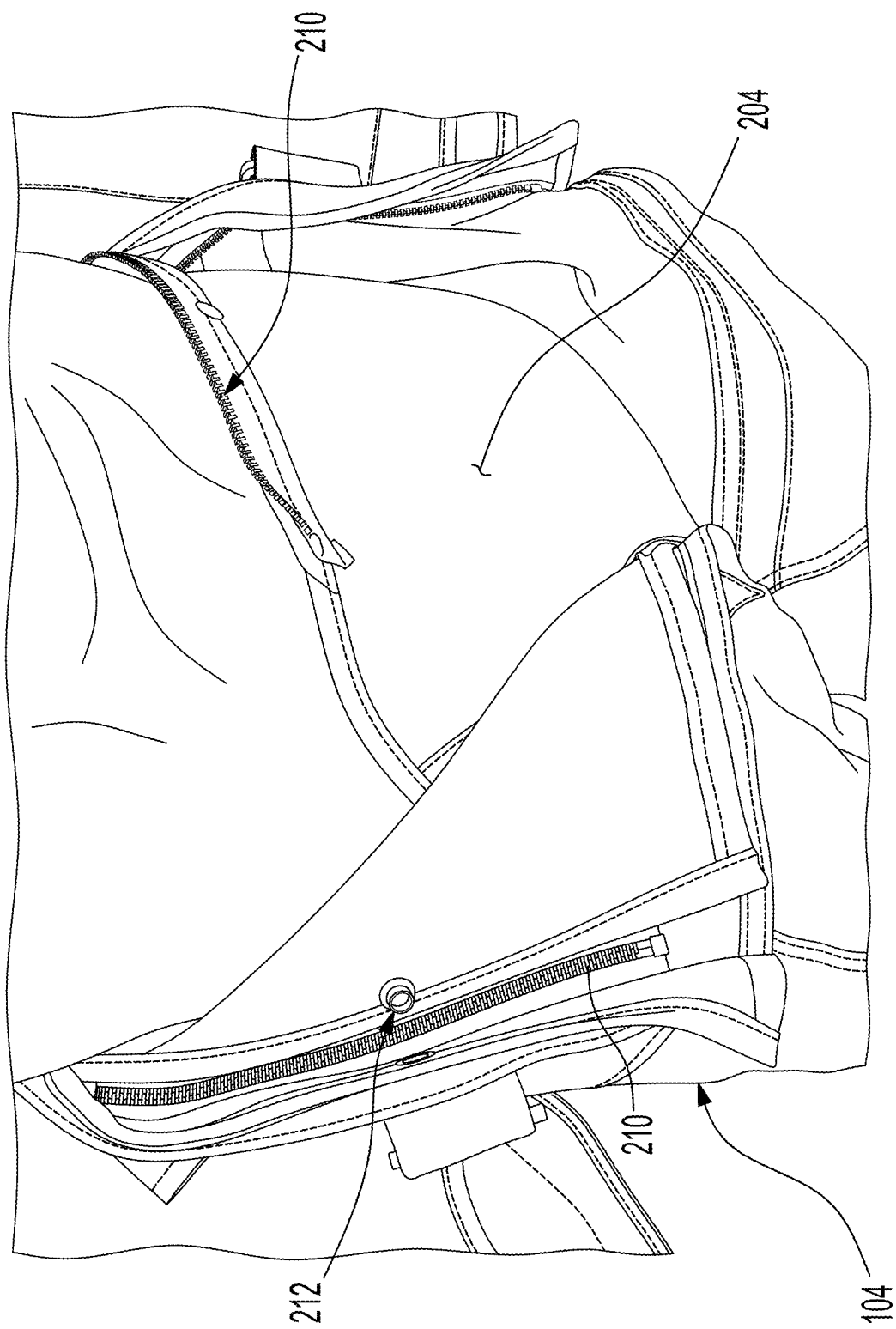
FIG. 15 is an illustration of the pant section of an insulating garment according to a preferred embodiment of the present invention worn under a firefighter bunker gear.
Figure 16:
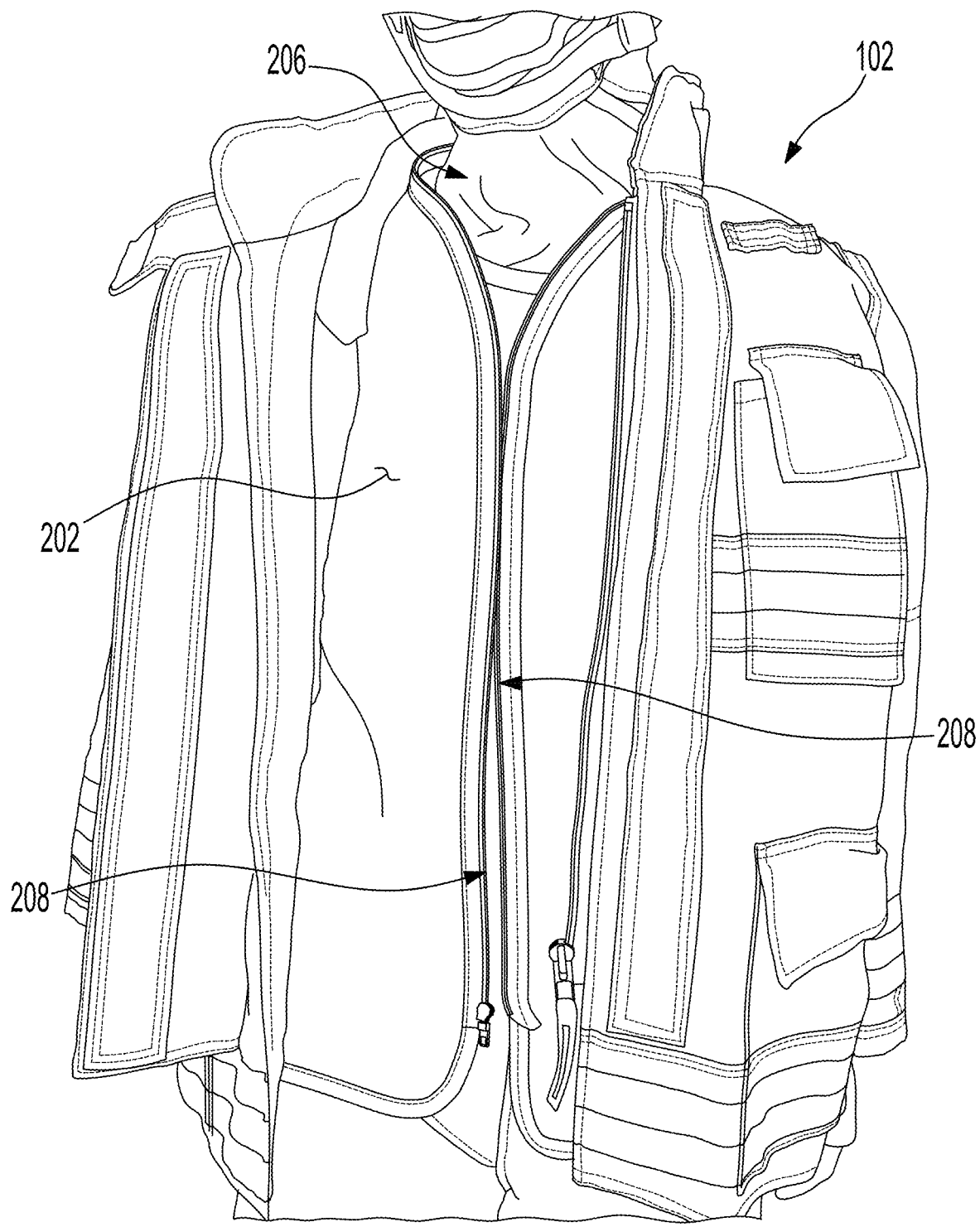
FIG. 16 is an illustration of the vest section of an insulating garment according to a preferred embodiment of the present invention worn under a firefighter bunker gear.

FIG. 12 shows a mannequin wearing a firefighter bunker gear (100) comprising a vest (102), pants (104), boots (106) and helmet (108). FIG. 12 shows the mannequin wearing the insulating garment (200) according to the present invention. The garment may comprise a vest (202) and pants (204) to be worn under the vest (102) and pants (104) of the bunker gear (100), and a balaclava (206) to be worn under the helmet (108). As also illustrated on FIG. 16, the vest (202) may have a zipper (208) for attaching the vest (202) of the garment (200) inside the vest (102) of the bunker gear (100). As better illustrated on FIG. 14 or 15, the pants (204) of the garment (200) may also have a zipper (210) or buttons (212) for attaching the pants (204) of the garment (200) to the pants (104) of the bunker gear (100). Other configurations of the garment can be produced without departing from the present invention. For instance, the garment can be a one-piece suit worn under the bunker gear.

The preferred materials used as components in the laminated double density fabric, or spacer fabric, i.e. building yarns (front and connection), and the laminated membrane are described hereafter. The connecting yarn must have good heat resistance and flame-retardant properties since it is the support of the double density architecture and therefore warrants its intrinsic properties of mechanical strength and thermal insulation. It shall preferably have a denier (titer of about 100 deniers) and should not melt. It must be a monofilament to bring these rigidity properties to the resilience of the product.

TABLE 1 connecting yarns used and potentially interesting

| Material | Abbreviation or Brand name | Linear density or titer (Denier) | Melting point temperature (° C.) | Glass transition (° C.) | Examples of manufacturer or supplier |
|---|---|---|---|---|---|
| Polyphenylene sulphide | PPS | 100 d | 285 | 88-93 | Sider Arc, Filva Procon, Evonik |
| Polyether ether ketone | PEEK | 100-200 d | ~345 | 143 | Zeus, Zyek |
| Polyetherimide | ULTEM ™ | | 218 | 216 | Sabic Innovative Plastics |

The face yarns are the yarns that make up the two face fabrics or knits which are connected by the connecting yarn of the spacer fabric. They provide fire resistance properties (flame and high temperature). They can preferably be made of Aramid fibers (as are the thermal barriers of existing products) and, moreover, the most performing as well as the lightest.

TABLE 2

Multi-filaments used and potentially interesting

| Name or Brand | Material | Linear density or Titre (dTex) | Manufacturer or supplier |
|---|---|---|---|
| Kevlar ™ | Para aramid: polyparaphenylene terephtalamide | 200 dTex | Dupont de Nemours |
| Technora ™ T240 | Para aramid: polyparaphenylene terephtalamide copolymer | 110 dTex | Teijin Aramid |
| Nomex ™ | Meta aramid: polymetaphenylene isophtalamide | 200 dTex | Dupont de Nemours |
| Zylon ™ | PBO poly(p-phenylene-2,6-benzobisoxazole) | 270 dTex | Toyobo corporation |

TABLE 3

Spun used and potentially interesting

| Name or Brand | Material | Linear density or Titre (dTex) | Manufacturer or supplier |
|---|---|---|---|
| Zylon ™ | PBO poly(p-phenylene-2,6-benzobisoxazole) | 130, 195 et 265 dTex | Toyobo corporation |
| Nomex ™ | Meta aramid | 140 d | Dupont de Nemours |
| Twaron ™ | Para aramid | 100 d | Changshu Baofeng Special Fiber Co. Ltd |
| Kermel ™ | Polyamide imide | — | Kermel |
| P-84 | Copolyimide | | Evonik Fibre |
| PBI | Polybenzimidazole | — | PBI Performance Products (Fibre) |

The membrane used to bring the properties of the moisture barrier is a waterproof-breathable (imper-respirante) membrane. In one embodiment, the thermal and moisture membrane or barrier is composed of a spacer fabric associated with a polymeric membrane made of ePTFE (ePolytetrafluoroethylene). or PTFE (polytetrafluoroethylène), FR-PU (polyurethane), or a mix thereof.

In one embodiment, the membrane was made of Stedair® 3000 from Stedfast Inc., made of ePTFE (expanded polytetrafluoroethylene) specially developed for firefighter clothing. Alternative materials could for example be Gore-Tex.

Specifically, the membrane is laminated directly to the outside of the spacer fabric to provide waterproofing and breathability properties. It will be applied on the outside so as to retain the current order of the layers of firefighter clothing: skin—thermal barrier—water-repellent/moisture barrier—outside fabric-air.

The interlacing techniques of yarn used to make fabrics, namely 3-D weaving and 3-D knitting, are presented hereafter.

The two layer double density textile fabric is better known as "spacer fabric", that involves two overlapping fabrics and held apart by a yarn called "binding yarn" or "connecting yarn".

In one embodiment, the air held between the two fabric layers optimizes thermal insulation.

As aforesaid, the compression resilience of the structure of the present invention, ensures to maintain a constant thermal insulation throughout the product, i.e. even at high compression areas such as knees, elbows and shoulders, critical for firefighters carrying heavy loads on shoulders, hence causing high compression in these areas, where burns could result by loss of thermal insulation due to compression. For instance, a compressive strength from about 0.5 to 2.5 cN·cm/cm$^2$ and a resilience of 25% and more would be adequate.

In fact, the two-layer fabric assembly consists of two superimposed fabrics or knits, physically connected by a continuous yarn; the method is similar to the manufacture of double piece velvet weaving with the exception that the two fabric layers are not separated after manufacture but rather used as is. This assembly of two separate but interrelated tissues can provide excellent thermal insulation due to the space filled with air between the two layers of tissue.

It is to be noted that the architecture used to produce the spacer fabric may directly influence the quality of the results obtained in terms of resilience and compression resistance of the spacer fabric.

Specifically the resilience and compression resistance of the spacer fabric may be directly related to the density of the connecting wire.

Also, the resilience and compression resistance of the spacer fabric may vary in relation with the width between the two fabric layers. A width from about 2.5 mm to 5 mm would be adequate, with the best results obtained being between 2.5 and 3.5 mm.

The evolutionary textile, acting as thermal barrier is made from a double part velvet manufacturing technique for obtaining a spacer fabric. The double part velvet allows for the keeping of air between its woven faces, which gives it a thermal barrier property. The following sets out the main manufacturing techniques of double part velvet weaving.

General Principles of Double Piece Velvet Weaving:

As illustrated on FIG. 6, two fabrics (42,43) are woven at the same time and on the same loom, one above the other, but separated by an air-filled gap (46). They each have their own elements: the warps 421 and 422 and the weft 423 forming the woven which constitutes the top piece, the warps 433 and 434 together with the weft 434 forming the woven which constitutes the bottom piece These two fabrics are connected to one another by pile warp monofilament passing successively from one side to the other of the fabric.

There are two modes of double piece velvet weaving:

Mode 1: The double-density weaving (3) with one connecting yarn by the insertion of one weft yarn at a time, in successively for the top part then for the bottom part. In this case, a connecting yarn (34) passes successively above the upper piece (32) and below the lower piece (33), as shown in FIG. 5.

Mode 2: The double-density weaving (40) with two connecting yarns (44, 45) weaving by simultaneous insertion of two weft, one for the upper piece (42) and one for the lower piece (43). In this case, two connecting yarns (44, 45) pass successively above the upper piece and below the lower piece, one in the opposite direction of the other, as shown in FIG. 6.

Using any of the techniques of manufacturing double piece velvet weaving, a thermal barrier consisting of two woven fabrics linked together and separated by an air filled gap may be manufactured (see FIGS. 3 and 4). This thermal barrier forms an integral part of firefighter bunker gear. FIGS. 3 to 7 shows a two-layer concept to a firefighter bunker gear, where double piece velvet acts both as moisture barrier and thermal barrier. The fabric or inner woven fabric may be replaced by a knitted fabric and the moisture barrier (gray membrane) is laminated on the outer face of the double velvet piece.

As was presented above for the manufacture of "double-density" fabrics, the evolutionary advantage of the present invention is the creation of a thermal barrier by the air caught between the two textile layers. In the case of knitwear, the distance between the two needle systems (simultaneously creating both fabrics) determines the thickness of the spacer fabric, whereas the connecting yarns pass from one face to the other of the product.

The following sets out the main double piece velvet knitwear manufacturing techniques.

Basically knitting consists of manufacturing textile fabrics by interleaving yarn loops. There are two types of knitting, warp knitting (yarn fed vertically on each needle) and the weft yarns (yarn deposited horizontally on all needles).

As for the manufacture of spacer fabrics, manufacture of spacer fabric knitwear is the result of knitting where the two layers are not separated. It is therefore the production of two separate fabrics bonded to each other by a connecting yarn which passes from one face to another. However, an interesting feature of the knitwear relative to the fabrics is the approximate 90° angle formed between the connecting yarn and the two faces of the knitted fabric. FIG. 7 shows a side view of a Raschel (warp knitting) using a connecting yarn and two yarns per side.

Figure 8:
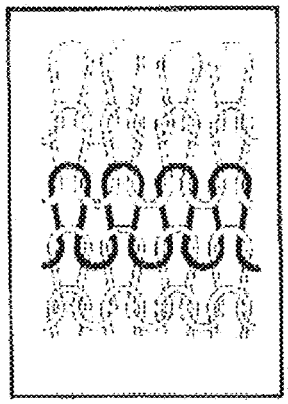
FIG. 8 is a schematic side view of weft knitted fabric according to a preferred embodiment of the present invention.
Figure 9:
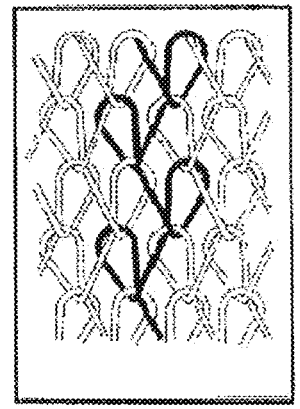
FIG. 9 is a schematic side view of warp knitted fabric according to a preferred embodiment of the present invention.
Figure 10:
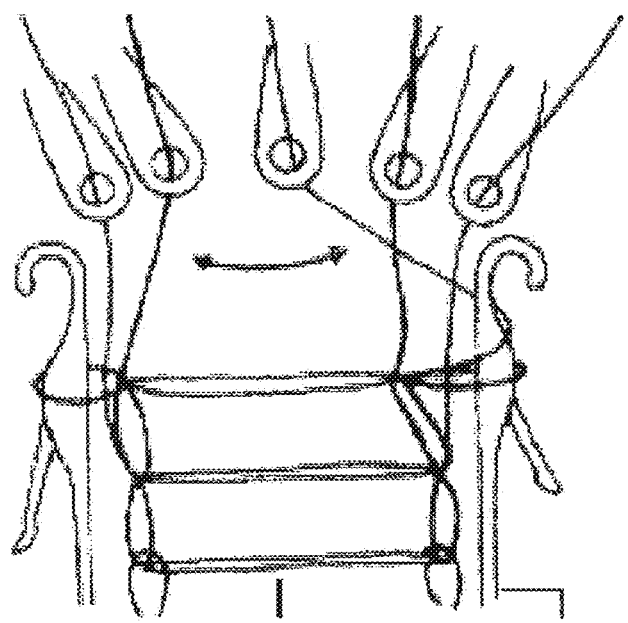
FIG. 10 is a schematic side view of the fabrication of a warp knitted spacer fabric according to a preferred embodiment of the present invention.

Using any of the techniques of double piece velvet knitting previously presented, a thermal barrier formed of two superimposed knits and separated by an air filled gap may be manufactured. FIG. 8 thus shows a knitted concept with two layers for firefighter bunker gear, where double piece velvet is both moisture barrier (lamination on the outer face of the double-density) and thermal barrier.

Increased Comfort

A survey emphasizing the human factor was conducted with a group of firefighters. The purpose of the study was to gather and evaluate the firefighter's perceptions of the new product of firefighter bunker gear. Different scenarios were conducted, both in static position and in a simulating course, including complex movement patterns as typically performed in the field (crawling in a tube, passing between wood frames of walls, etc. . . . ).

The user panel included:
  2 Heads of division (Material Resources Division and Strategies and Tactics Division)
  2 firefighters
  1 Lieutenant
  1 Captain
  1 Operation Manager Users reviews have been numerous and predominantly positive, here is a summary list of their perceptions:
  "lighter",
  "very comfortable: ease of movement and weight",
  "This type of garment would do easily the job on the field",
  "lightness",
  "flexibility",
  "quick to put on",
  "more comfortable"
  and "positive impression: flexible, comfortable movements".

Weight
  Surface Mass
  Studied commercial products (Thermal Barrier+moisture Barrier): from 436-447 g/m$^2$ Developed product: from 420-496 g/m$^2$ Summary of Tests that have been Realized The product has been developed to meet the performance standard NFPA 1971 (National Fire Protection Association) for
  Thermal Protective performance (TPP) is required to be a minimum of 35 cal/cm$^2$·s The developed product achieved performance results from 35 to 40 cal/cm$^2$·s. Thermal Protection can be improved by modifying one or many of the following parameters: fiber blend, thickness of the laminated spacer fabric, nature of the outershell used to complete the multilayer garment, lamination process, adhesive used, and/or type of membrane.

Total Heat Loss (THL) is required to be a minimum of 205 W/m²

The developed product achieved performance results from 231 to 258 and 267. The product has results from 205 to more than 250 or 260 W/m² and can go as higher than 300 W/m². Total Heat Loss can be improved by modifying one or many of the following parameters: thickness of the laminated spacer fabric, type of membrane, outershell used to complete the multilayer garment, lamination process, adhesive used, hydrophilicity of the spacer fabric (inherent to the material or by applying a chemical treatment such as a wetting agent).

Flame resistance requirements are:
  maximum 100 mm of char length;
  maximum 2 seconds of after flame;
  no melt;
  no dripping
The developed product does meet these 4 performance requirements.
Heat thermal resistance requirements are:
  Maximum shrinkage of 10%
  No melting
  No ignition
  No separation
The developed product does meet these 4 performance requirements.
Water penetration—FTMS 191A method 5512 requirement is:
  minimum 172 kPa
The developed product achieved performance results of 950 as received and 1050 after washing and thermal treatment.
Liquid penetration resistance—ASTM F903C requirement is:
  no penetration for at least one hour with the following chemicals:
    Aqueous Film Forming Foam;
    Battery Acid;
    Fire resistant hydraulic fluid;
    Surrogate gasoline fuel C;
    Swimming pool chlorinating chemical.
The developed product does meet the requirements with these chemicals.

The following tables detail the results of a sample product, as compared to prior art.

| Test | Method (according to NFPA 1971-13) | Details | New Concept 2 layers PF04PPS-LML* | | Specifications NFPA 1971-13 |
|---|---|---|---|---|---|
| Weight g/m² | | | 496 | | — |
| Thickness mm | | | 3.04 | | — |
| 1. Test on thermic barrier | | | | | |
| Flame resistance: vertical test mm s | ASTM D 6413 | As received After 5 washings As received After 5 washings | Long 28 22 Long 1.5 1.6 | Large 32 30 Large 1.0 1.3 | Mean damaged length: max 100 mm Mean time flame exposure: maximum of 2.0 s. |
| | | | non | non | No dripping |
| Heat and thermal shrinkage resistance Test 260° C.) % | ISO 17493 2000 | As received After 5 washings | Long 1.6 1.4 | Large 4.2 4.9 | Maximal shrinking of 10% |
| 2. Test sur Barrière Humidifuge | | | | | |
| Water penetration resistance kPa (Psi) | FTMS 191A, Method 5512 | As received After conditioning Par. 8.26.3.3. | 951 1051 | | Minimum of 172 kPa (or 25 Psi) |
| Liquid penetration resistance | ASTM F903, Procedure C | | No liquid penetration | | During at least one hour 1 h |
| Light degradation resistance | ASTM G155, Cycle 8 ASTM D751, Procedure B Section 46-49 | | No water appearing on surface | | No water on surface |
| 3. Test on Composite (TB + MB + OS (Gemini XT) | | | | | |
| Thermal Protective Performance, TPP cal/cm² · s | ISO 17492 | As received After 5 washings | 35.60 35.00 | | Minimum of 35 cal/cm² · s |
| Thermal heat loss, THL W/m² | ASTM F1868-02 | As received | 231.55 | | Minimum of 205 W/m² |

Prototypes of Double-Density

| Sample | Top layer | Pile Yarn | Base layer |
|---|---|---|---|
| PF04PPS | Nomex™ 140 d spun | PPS monofilament 100 d Filva | Nomex 140 d spun |

Prototypes of Double-Density Laminated

| Sample | Details |
|---|---|
| PF04PPS-LML* | PF04PPS-G<br>Thermo-fixed by Coraltex (Via Oratex),<br>Washed by G&K Services<br>Laminated by Stedfast,<br>Second wash by G&K Services<br>washed once with CTT before testing |

Prototypes 17 prototypes were made with various blends as follows:

| Samples | Top layer | Membrane | Base layer | Pile Yarn | Particularity |
|---|---|---|---|---|---|
| CTT-021-01 | Nomex 140 d spun | | Nomex 140 d spun | PPS monofilament 100 d | |
| CTT-021-02 | Nomex 140 d spun | | Nomex 140 d spun | PPS monofilament 100 d | With texturized multifilament (1000 d para-aramid) inside the spacer fabric |
| CTT-021-03 | Twaron 100 d spun | | Twaron 100 d spun | PPS monofilament 100 d | With texturized multifilament (1000 d para-aramid) inside the spacer fabric |
| CTT-021-04 | Nomex 140 d spun | | Nomex 140 d spun | PPS monofilament 100 d | Sandwich: With knit laminated on spacer (50 g/m$^2$) |
| CTT-021-05 | Twaron 100 d spun | | Twaron 100 d spun | PPS monofilament 100 d | |
| CTT-021-06 | Twaron 100 d spun | | Twaron 100 d spun | PPS monofilament 100 d | Sandwich: With knit laminated on spacer (50 g/m$^2$) |
| #1-2010 | Twaron 100 d spun | FRBM* | Twaron 100 d spun | Retor 3 bouts de 100 d chacun (Multifilament Kevlar) | |
| #2-2010 | Twaron 100 d spun | FRBM | Twaron 100 d spun | Multifilament Kevlar 200 d | Double density of 385 g/m$^2$ |
| #3-2010 | Twaron 100 d spun | FRBM | Twaron 100 d spun | Multifilament Kevlar 200 d | Double densité de 335 g/m$^2$ |
| #2.2-2010 | Twaron 100 d spun | FRBM | Twaron 100 d spun | Retor 3 pieces of 200d each (Multifilament Kevlar) | #2-2010, with the wetting agent Hydroperm RPU à 50 g/L (71.75% Pick-up) |
| PF-01 PPS | Nomex 140 d spun | FRBM | Nomex 140 d spun | PPS monofilament 100 d SiderArc | First sample for the making of the vest, similar with CTT-021-01 |
| PF-02 PPS | Nomex 140 d spun | FRBM | Nomex 140 d spun | PPS monofilament 100 d Filva | |
| PF-03a PPS F | 50% Nomex 140 d spun<br>50% PBI Spun | FRBM | Nomex 140 d spun | PPS monofilament 100 d Filva | PBI spun added for improving TPP |
| PF-03b PPS F | 66% Nomex 140 d spun<br>33% PBI Spun | FRBM | Nomex 140 d spun | PPS monofilament 100 d Filva | |
| PF-03c PPS F | 75% Nomex 140 d spun<br>25% PBI Spun | FRBM | Nomex 140 d spun | PPS monofilament 100 d Filva | |
| PF-04 PPS | Nomex 140 d spun | FRBM | Nomex 140 d spun | PPS monofilament 100 d Filva | |

-continued

| Samples | Top layer | Membrane | Base layer | Pile Yarn | Particularity |
|---|---|---|---|---|---|
| PF-05 PPS | Nomex 140 d spun | FRBM | 50% Nomex 140 d spun 50% multifilament Kevlar | PPS monofilament 100 d Filva | Confort improved Kevlar: 200 den Kevlar Natural 7.5 TPI "Z" |

*FRBM: Fire retardant breathable barrier

The Thermal Protection TPP can be improved by modifying one or many of the following parameters: fiber blend, thickness of the laminated spacer fabric, outershell used to complete the multilayer garment, lamination process, adhesive used, type of membrane.

Total Heat Loss THL, can be improved by modifying one or many of the following parameters: thickness of the laminated spacer fabric, type of membrane, outershell used to complete the multilayer garment, lamination process, adhesive used, hydrophilicity of the spacer fabric (inherent to the material or by applying a chemical treatment such as a wetting agent).

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What is claimed is:

1. An insulating garment for use as thermal and moist repellent barrier in a firefighter bunker gear, the garment being made from a fire-resistant insulating fabric comprising:
   a first woven fire-resistant fabric layer;
   a second woven fire-resistant fabric layer; and
   at least one monofilament yarn interconnecting the first and second layers, thereby creating an insulating space between the layers, each monofilament yarn comprising at least one of polyphenylene sulphide, polyether ether ketone, or polyetherimide to maintain the insulating space between the layers and therefore thermal and moist insulation.

2. The insulating garment of claim 1, further comprising a waterproof-breathable membrane laminated on one of the layers, the membrane being breathable and adapted to repel water and/or moisture.

3. The insulating garment of claim 1, wherein the garment comprises a top section forming a vest and a bottom portion forming pants, the vest and the pants having a size adapted to be worn by the firefighter.

4. The insulating garment of claim 3, wherein the vest and the pants comprise an attaching system adapted to removably attach the vest and the pants to an inside surface of the bunker gear.

5. The insulating garment of claim 1, wherein each monofilament yarn of the insulating fabric forms an angle of about 90° with each inside surface of the layers of the fabric.

6. The insulating garment of claim 1, wherein the insulating fabric comprises two monofilament yarns intermingling within the insulating space to improve compressive strength.

7. The insulating garment of claim 1, wherein the at least one monofilament yarn has a linear density of superior to 100 deniers and a melting point superior or equal to 200° C.

8. The insulating garment of claim 1, wherein the first and second layers of the fabric have a linear density of between 100 and 265 dTex.

9. The insulating garment of claim 1, wherein the first and second fabric layers are made of spun yarn and/or multifilament yarn comprising fire-resistant material selected from the group consisting of polyparaphenylene terephtalamide; polyparaphenylene terephtalamide copolymer; polymetaphenylene isophtalamide; poly(pphenylene-2,6-benzobisoxazole; polyamide imide; polyimide and poly[2,2'-(m-phenylen)-5,5'-bisbenzimidazole].

10. A method for the making of an insulating garment for use as thermal and moist repellent barrier in a firefighter bunker gear, the method comprising the steps of:
   a) providing a first woven fire-resistant fabric layer;
   b) providing a second woven fire-resistant fabric layer;
   c) interconnecting the first and second layers with at least one monofilament yarn, thereby making a fire-resistant insulating fabric with an insulating space between the layers; and
   d) assembling the fire-resistant insulating fabric formed in step c) to form the insulating garment; wherein each monofilament yarn used in step c) comprises at least one of polyphenylene sulphide, polyether ether ketone, or polyetherimide in order to maintain the insulating space between the layers when the insulating garment is used under the bunker gear.

11. The method of claim 10, further comprising before step d) the step of laminating a waterproof-breathable membrane on one of the layers, the membrane being breathable and adapted to repel water and/or moisture.

12. The method of claim 10, wherein step d) comprises the steps of making a top section forming a vest and a bottom portion forming pants, the vest and the pants having a size adapted to be worn by the firefighter.

13. The method of claim 12, wherein step d) further comprises the steps of fixing to the vest and pants an attaching system adapted to removably attach the vest and the pants to an inside surface of the bunker gear.

14. The method of claim 10, wherein in step c) each monofilament yarn of the fabric once interconnecting the layers forms an angle of about 90° with each inside surface of the layers.

15. The method of claim 10, wherein step c) comprises the step of intermingling two monofilament yarns within the insulating space to improve compressive strength.

16. The method of claim 10, wherein the at least one monofilament yarn used in step c) has a linear density of superior to 100 deniers and a melting point superior or equals to 200° C.

17. The method of claim 10, wherein the first and second layers of the fabric have a linear density of between 100 and 265 dTex.

18. The method of claim 10, wherein the first and second layers of the fabric are made of spun yarn and/or multifilament yarn comprising fire-resistant material selected from the group consisting of polyparaphenylene terephtalamide; polyparaphenylene terephtalamide copolymer; polymetaphenylene isophtalamide; poly(pphenylene-2,6-benzobisoxazole; polyamide imide; polyimide and poly[2,2'-(m-phenylen)-5,5'-bisbenzimidazole].

* * * * *